United States Patent
Sacchetti et al.

(10) Patent No.: US 6,627,710 B1
(45) Date of Patent: Sep. 30, 2003

(54) CATALYST COMPONENTS FOR THE POLYMERIZATION OF OLEFINS AND CATALYSTS THEREFROM OBTAINED

(75) Inventors: Mario Sacchetti, Ferrara (IT); Diego Brita, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 97 days.

(21) Appl. No.: 09/763,218

(22) PCT Filed: Jun. 8, 2000

(86) PCT No.: PCT/EP00/05349
§ 371 (c)(1),
(2), (4) Date: Feb. 16, 2001

(87) PCT Pub. No.: WO00/78820
PCT Pub. Date: Dec. 28, 2000

(30) Foreign Application Priority Data

Jun. 18, 1999 (EP) .............................. 99201969

(51) Int. Cl.[7] .................................................. C08F 4/76
(52) U.S. Cl. ................... 526/112; 526/348; 526/119; 526/123.1; 526/124.2; 526/124.3; 526/142; 502/103; 502/119; 502/125; 502/134
(58) Field of Search ................... 526/348, 112, 526/119, 123.1, 124.2, 124.3, 142; 502/103, 119, 125, 134

(56) References Cited

U.S. PATENT DOCUMENTS

| | | | |
|---|---|---|---|
| 4,399,054 A | * 8/1983 | Ferraris et al. | 252/429 B |
| 4,469,648 A | 9/1984 | Ferraris et al. | 264/9 |
| 4,829,034 A | 5/1989 | Iiskolan et al. | 302/9 |
| 5,100,849 A | 3/1992 | Miya et al. | 502/9 |
| 5,733,987 A | 3/1998 | Covezzi et al. | 526/65 |

FOREIGN PATENT DOCUMENTS

| | | | |
|---|---|---|---|
| EP | 0119963 | 9/1984 | C08F/210/02 |
| EP | 0553806 | 8/1993 | C08F/10/00 |
| EP | 0 601 525 A1 | * 6/1994 | |
| WO | 9221706 | 12/1992 | C08F/10/00 |
| WO | 9303078 | 2/1993 | C08F/297/08 |
| WO | 9532995 | 12/1995 | C08F/10/00 |
| WO | 9844009 | 10/1998 | C08F/4/02 |

* cited by examiner

Primary Examiner—Ling-Siu Choi

(57) ABSTRACT

The invention relates to catalyst components, suitable for the preparation of homopolymers and copolymers of ethylene having a broad molecular weight distribution (MWD), which comprise Ti, Mg, Cl, and are characterized by the following properties: surface area, determined by BET method, of lower than 100 $m^2/g$, a total porosity, measured by the mercury method, of higher than 0.25 $cm^3/g$, a pore radius distribution such that at least 45% of the total porosity is due to pores with radius up to 0.1 $\mu m$.

35 Claims, No Drawings

CATALYST COMPONENTS FOR THE POLYMERIZATION OF OLEFINS AND CATALYSTS THEREFROM OBTAINED

The present invention relates to catalyst components for the polymerization of olefins $CH_2=CHR$, wherein R is hydrogen or hydrocarbon radical having 1–12 carbon atoms. In particular, the invention relates to catalyst components suitable for the preparation of homopolymers and copolymers of ethylene having a broad molecular weight distribution (MWD), and to the catalysts obtained therefrom.

In particular the present invention relates to a solid catalyst component, comprising titanium magnesium and halogen, having spherical morphology and particular surface characteristics. Furthermore, the present invention relates to a process for preparing ethylene homopolymers and copolymers characterized by a high melt flow ratio (F/E) value, which is the ratio between the melt index measured with a 21.6 Kg load (melt index F) and the melt index measured with a 2.16 Kg load (melt index E), determined at 190° C. according to ASTM D-1238. Said ratio F/E is generally considered as an indication of the width of molecular weight distribution. The MWD is a particularly important characteristic for ethylene (co) polymers, in that it affects both the rheological behavior and therefore the processability of the melt, and the final mechanical properties. Polyolefins having a broad MWD, particularly coupled with relatively high average molecular weights, are preferred in high speed extrusion processing and in blow molding, conditions in which a narrow MWD could cause melt fracture. As a consequence of this need, different methods have been developed trying to achieve this property. One of those is the multi-step process based on the production of different molecular weight polymer fractions in single stages, sequentially forming macromolecules with different length on the catalyst particles.

The control of the molecular weight obtained in each step can be carried out according to different methods, for example by varying the polymerization conditions or the catalyst system in each step, or by using a molecular weight regulator. Regulation with hydrogen is the preferred method either working in solution or in gas phase.

A problem typically associated with the processes of this type is that the different polymerization conditions used in the two steps can lead to the production of not sufficiently homogenous products, especially in cases of very broad molecular weight distributions. It is in fact difficult to obtain products having a high F/E ratio, for example higher than 100, which when subjected to a transformation process, yield products with a low number of unmelt particles (gels). In order to solve or minimize this problem it would be important to have a catalyst capable of producing broad MWD polymers also in a single polymerization step. This would allow, in case still broader MWD is desired, the use of less different polymerization conditions in the sequential polymerization process that would finally result in a more homogeneous product.

EP-A-119963 discloses catalyst components obtained by the reaction between a titanium halide and $MgCl_2$-based carriers, containing from 1.5 to 20% of residual —OH groups, which are obtained by spray-drying $MgCl_2.EtOH$ solutions. The weight reaction ratio between the titanium halide and the $MgCl_2$ of the carrier has to be kept within the 0.001 to 2 range. The catalysts obtained however, are not able to give broad MWD since the shear sensitivity of the polymers (which is the ratio between the melt indices measured at weight of 20 kg and 2.16 kg at 190° C.) is about 25 (examples 4–5 and 8–9) although the polymerization process comprises two polymerization step under different conditions.

Moreover, the catalysts disclosed in this patent application are always used in a suspension polymerization process, while nothing is said about gas-phase polymerization. This latter kind of process is nowadays highly preferred due to both the high qualities of the products obtained and to the low operative costs involved with it. It would therefore be advisable to have a catalyst capable to produce broad MWD polymers and having at the same time the necessary features allowing its use in the gas-phase polymerization processes.

In EP-A-601525 are disclosed catalysts that, in some cases are able to give ethylene polymers with broad MWD (F/E ratios of 120 are reported). Such catalysts, obtained by a reaction between a Ti compound and a $MgCl_2.EtOH$ adduct which has been subject to both physical and chemical dealcoholation, are characterized by a total porosity (mercury method) higher than 0.5 $cm^3/g$, a surface area (BET method) lower than 70 $m^2/g$. The pore distribution is also specific; in particular in all the catalysts specifically disclosed at least 50% of the porosity is due to pores with radius higher than 0.125 $\mu$. Although the width of MWD is in some cases of interest, the bulk density of the polymers obtained is relatively low and this is probably due to non completely regular shape of the polymer formed which is in turn caused by non-proper behavior of the catalyst during polymerization. Hence, it is still very important to have a solid catalyst component capable of good performances in the gas-phase polymerization process (in particular capable of producing high bulk density polymer) and at the same time capable of giving polymers with a very broad MWD.

It has now surprisingly been found a catalyst component which satisfies the above-mentioned needs and that is characterized by comprising Ti, Mg, Cl, and by the following properties:

surface area, determined by BET method, of lower than 100 $m^2/g$, a total porosity, measured by the mercury method, of higher than 0.25 $cm^3/g$ a pore radius distribution such that at least 45% of the total porosity is due to pores with radius up to 0.1 $\mu m$.

Preferably the catalyst component of the invention comprises a Ti compound having at least one Ti-halogen bond supported on magnesium chloride in active form. The catalyst component may also contain groups different from halogen, in any case in amounts lower than 0.5 mole for each mole of titanium and preferably lower than 0.3.

The total porosity is generally comprised between 0.35 and 1.2 $cm^3/g$, in particular between 0.38 and 0.9.

The porosity due to pores with radius up to 1 $\mu m$ is generally comprised between 0.3 and 1 $cm^3/g$ in particular between 0.34 and 0.8. In general terms the value of the porosity due to pores with radius higher than 1 $\mu m$ is rather limited with respect to the total porosity value. Normally this value is lower than 25% and in particular lower than 15% of the total porosity. The surface area measured by the BET method is preferably lower than 80 and in particular comprised between 30 and 70 $m^2/g$. The porosity measured by the BET method is generally comprised between 0.1 and 0.5, preferably from 0.15 to 0.4 $cm^3/g$.

As mentioned above the catalyst of the invention show a particular pore radius distribution such that at least 45% of the total porosity is due to pores with radius up to 0.1 $\mu m$. Preferably, more than 50%, and in particular more than 65% of the total porosity is due to pores with radius up to 0.1 $\mu m$. If only the porosity due to pores with radius up to 1 $\mu m$ is taken into account, the value of the porosity due to pores with radius up to 0.1 μm is even higher, generally more than 60%, preferably more than 70% and particularly more than 80%.

This particular pore size distribution is also reflected in the average pore radius value. In the catalyst component of the invention the average pore radius value, for porosity due to pores up to 1 μm, is lower than 900, preferably lower than 800 and still more preferably lower than 700. The particles of solid component have substantially spherical morphology and average diameter comprised between 5 and 150 μm. As particles having substantially spherical morphology, those are meant wherein the ratio between the greater axis and the smaller axis is equal to or lower than 1.5 and preferably lower than 1.3.

Magnesium chloride in the active form is characterized by X-ray spectra in which the most intense diffraction line which appears in the spectrum of the non active chloride (lattice distanced of 2,56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The components of the invention can also comprise an electron donor compound (internal donor), selected for example among ethers, esters, amines and ketones. Said compound is necessary when the component is used in the stereoregular (co)polymerization of olefins such as propylene, 1-butene, 4-methyl-pentene-1. In particular, the internal electron donor compound can be selected from the alkyl, cycloalkyl and aryl ether and esters of polycarboxylic acids, such as for example esters of phthalic and maleic acid, in particular n-butylphthalate, di-isobutylphthalate, di-n-octylphthalate.

Other electron donor compounds advantageously used are the 1,3-diethers of the formula:

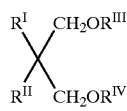

wherein $R^I$, $R^{II}$, the same or different from each other, are alkyl, cycloalkyl, aryl radicals having 1–18 carbon atoms and $R^{III}$, $R^{IV}$, the same or different from each other, are alkyl radicals having 1–4 carbon atoms.

The electron donor compound is generally present in molar ratio with respect to the magnesium comprised between 1:4 and 1:20.

The preferred titanium compounds have the formula $Ti(OR^V)_nX_{y-n}$, wherein n is a number comprised between 0 and 0.5 inclusive, y is the valence of titanium, $R^V$ is an alkyl, cycloalkyl or aryl radical having 2–8 carbon atoms and X is halogen. In particular $R^V$ can be n-butyl, isobutyl, 2-ethylhexyl, n-octyl and phenyl; X is preferably chlorine.

If y is 4, n varies preferably from 0 to 0.02; if y is 3, n varies preferably from 0 to 0.015. A method suitable for the preparation of spherical components of the invention comprises the following steps:

(a) reacting a compound $MgCl_2 \cdot mR^{VI}OH$, wherein $0.3 \leq m \leq 1.7$ and $R^{VI}$ is an alkyl, cycloalkyl or aryl radical having 1–12 carbon atoms, with a titanium compound of the formula $Ti(OR^V)_nX_{y-n}$, in which n is comprised between 0 and 0,5, y is the valence of titanium, X is halogen and $R^V$ is an alkyl radical having 2–8 carbon atoms;

(b) reacting the product obtained from (a) with An Al-alkyl compound and (c) reacting the product obtained from (b) with a titanium compound of the formula $Ti(OR^V)_nX_{y-n}$, in which n is comprised between 0 and 0,5, y is the valence of titanium, X is halogen and $R^V$ is an alkyl radical having 2–8 carbon atoms.

The compound $MgCl_2 \cdot mR^{VI}OH$ is prepared by thermal dealcoholation of adducts $MgCl_2 \cdot pR^{VI}OH$, wherein p is equal to or higher than 2 and preferably ranging from 2.5 to 3.5. It is especially preferred the use of adducts in which $R^{VI}$ is ethyl.

The adducts, in spherical form, are prepared from molten adducts by emulsifying them in liquid hydrocarbon and thereafter solidifying them by quick cooling. Representative methods for the preparation of these spherical adducts are reported for example in U.S. Pat. No. 4,469,648, U.S. Pat. No. 4,399,054, and WO98/44009. Another suitable method for the spherulization is the spray cooling described for example in U.S. Pat. Nos. 5,100,849 and 4,829,034. As mentioned above the so obtained adducts are subjected to thermal dealcoholation at temperatures comprised between 50 and 150° C. until the alcohol content is reduced to values lower than 2 and preferably comprised between 0.3 and 1.7 moles per mole of magnesium dichloride.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular $TiCl_4$. The reaction with the Ti compound can be carried out by suspending the compound $MgCl_2 \cdot mR^{VI}OH$ in cold $TiCl_4$ (generally 0° C.); the mixture is heated up to 80–140° C. and kept at this temperature for 0.5–2 hours. The excess of titanium compound is separated at high temperatures by filtration or sedimentation and siphoning. If the titanium compound is a solid, such as for example $TiCl_3$, this can be supported on the magnesium halide by dissolving it in the starting molten adduct. In step (b) the product obtained from (a) is then reacted with an aluminum-alkyl compound. The aluminum alkyl compound is preferably selected from those of formula $R^{VII}_zAlX_{3-z}$ in which $R^{VII}$ is a $C_1$–$C_{20}$ hydrocarbon group, z is an integer from 1 to 3 and X is halogen, preferably chlorine. Particularly preferred is the use of the trialkyl aluminum compounds such as for example triethylaluminum, triisobutylaluminum, tri-n-butylaluminum, tri-n-hexylaluminum, tri-n-octylaluminum and tris(2,4,4-trimethyl-pentyl)aluminum. Use of tris(2,4,4-trimethyl-pentyl)aluminum is especially preferred. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

The reaction with the Al-alkyl compound with the product coming from (a) can be carried out in a hydrocarbon solvent at a temperature between −10° C. and 130° C. Preferably the reaction is carried out at a temperature between 40 and 110° C. The molar ratio between the Al-alkyl compound and the product coming from (a) is not particularly critical. Generally the Al-alkyl compound can be used in molar ratios with the alcohol originally contained in the compound (a) from 0.01 to 100.

In the third step, the solid product coming from (b) is further reacted with a titanium compound of formula $Ti(OR^V)_nX_{y-n}$ in which n, $R^V$, X and y have the same meaning given above. The specific titanium compound and the reaction conditions can be identical to, or different from, those used in the first step. Normally, the use of the same titanium compound and the same reaction conditions is preferred.

The catalyst components of the invention form catalysts, for the polymerization of alpha-olefins $CH_2=CHR^{VIII}$ wherein $R^{VIII}$ is hydrogen or a hydrocarbon radical having 1–12 carbon atoms by reaction with Al-alkyl compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 20 and 800.

In the case of the stereoregular polymerization of α-olefins such as for example propylene and 1-butene, an electron donor compound (external donor) which can be the same or different from the compound used as internal donor is also generally used in the preparation of the catalyst. In the case in which the internal donor is an ester of a polycarboxylic acid, in particular a phthalate, the external donor is preferably selected from the silane compounds containing at least a Si-OR link, having the formula $R^{IX}_{4-n}Si(OR^X)_n$, wherein $R^{IX}$ is an alkyl, cycloalkyl, aryl radical having 1–18 carbon atoms, $R^X$ is an alkyl radical having 1–4 carbon atoms and n is a number comprised between 1 and 3. Examples of these silanes are methyl-cyclohexyl-dimethoxysilane, diphenyl-dimethoxysilane, methyl-t-butyl-dimethoxysilane, dicyclopentyldimethoxysilane. It is possible to advantageously use also the 1,3 diethers having the previously described formula. In the case in which the internal donor is one of these diethers, the use of an external donor can be avoided, as the stereospecificity of the catalyst is already sufficiently high. The spherical components of the invention and catalysts obtained therefrom find applications in the processes for the preparation of several types of olefin polymers.

For example the following can be prepared: high density ethylene polymers (HDPE, having a density higher than 0.940 g/cm³), comprising ethylene homopolymers and copolymers of ethylene with alpha-olefins having 3–12 carbon atoms; linear low density polyethylene's (LLDPE, having a density lower than 0.940 g/cm³) and very low density and ultra low density (VLDPE and ULDPE, having a density lower than 0.920 g/cm³, to 0.880 g/cm³ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight. However, as previously indicated they are particularly suited for the preparation of broad MWD polymers and in particular of broad MWD ethylene homopolymers and copolymers containing up to 20% by moles of higher $_\alpha$-olefins such as propylene, 1-butene, 1-hexene, 1-octene. In particular the catalysts of the invention are able to give ethylene polymers, in a single polymerization step, with a F/E ratio higher than 100 and even higher than 120 that are indicative of exceptionally broad MWD. The F/E ratio can be further increased by operating in two sequential polymerization reactors working under different conditions.

The catalyst of the present invention can be used as such in the polymerization process by introducing it directly into the reactor. However, it constitutes a preferential embodiment the prepolymerization of the catalyst. In particular, it is especially preferred pre-polymerizing ethylene or mixtures thereof with one or more α-olefins, said mixtures containing up to 20% by mole of α-olefin, forming amounts of polymer from about 0.1 g per gram of solid component up to about 1000 g per gram of solid catalyst component. The pre-polymerization step can be carried out at temperatures from 0 to 80° C. preferably from 5 to 50° C. in liquid or gas-phase. The pre-polymerization step can be performed in-line as a part of a continuos polymerization process or separately in a batch process. The batch pre-polymerization of the catalyst of the invention with ethylene in order to produce an amount of polymer ranging from 0.5 to 20 g per gram of catalyst component is particularly preferred.

The main polymerization process in the presence of catalysts obtained from the catalytic components of the invention can be carried out according to known techniques either in liquid or gas phase using for example the known technique of the fluidized bed or under conditions wherein the polymer is mechanically stirred. Preferably the process is carried out in the gas phase.

Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised.

Therefore, in the case that the polymerization takes place in gas-phase, the process of the invention is suitably carried out according to the following steps:

(a) contact of the catalyst components in the absence of polymerizable olefin or optionally in the presence of said olefin in amounts not greater than 20 g per gram of the solid component (A);

(b) pre-polymerization of ethylene or mixtures thereof with one or more α-olefins, said mixtures containing up to 20% by mole of α-olefin, forming amounts of polymer from about 0.1 g per gram of solid component (A) up to about 1000 g per gram;

(c) gas-phase polymerization of ethylene or mixtures thereof with α-olefins $CH_2=CHR$, in which R is a hydrocarbon radical having 1–10 carbon atoms, in one or more fluidized or mechanically stirred bed reactors using the pre-polymer-catalyst system coming from (b).

As mentioned above, the pre-polymerization step can be carried out separately in batch. In this case, the pre-polymerized catalyst is pre-contacted according to step (a) with the aluminum alkyl and then directly sent to the gas-phase polymerization step (c).

As mentioned above, in order to further broaden the MWD of the product, the process of the invention can be performed in two or more reactors working under different conditions and optionally by recycling, at least partially, the polymer which is formed in the second reactor to the first reactor. As an example the two or more reactors can work with different concentrations of molecular weight regulator or at different polymerization temperatures or both. Preferably, the polymerization is carried out in two or more steps operating with different concentrations of molecular weight regulator. In particular, when the catalysts of the invention are used in this kind of process they are able to give ethylene polymers having exceptionally broad MWD while, at the same time, maintaining a good homogeneity. Once used in the production of films indeed, the polymers showed a very good processability while the films obtained showed a very low number of gels.

The following examples are given in order to further describe and not to limit the present invention.

The properties are determined according to the following methods:

Porosity and surface area with nitrogen: are determined according to the B.E.T. method (apparatus used SORPTOMATIC 1900 by Carlo Erba).

Porosity and surface area with mercury:

The measure is carried out using a "Porosimeter 2000 series" by Carlo Erba. The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1-10^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), both total and that due to pores up to 1 µm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

| MIE flow index: | ASTM-D 1238 |
| MIF flow index: | ASTM-D 1238 |
| Bulk density: | DIN-53194 |
| Fraction soluble in xylene: | determined at 25° C. |
| Effective density: | ASTM-D 792 |

Determination of gel number: 1 Kg of polymer is pelletized by a Bandera TR15 pelletizer for 1 hour keeping the temperature at 230° C. in all the sections with the screw rotating at 50 rpm. The first 300 grams of material are discarded while the remaining is introduced in a Plasticizers MKII film extruder with a 3000 mesh/cm² filter in which the profile temperature was 260-260-260-270-270° C. and the screw rotation speed was 30 rpm. The determination of the number of gels per m² is carried out by visually detecting the number of gels having size higher than 0.2 mm on a piece of the extruded film (30×4 cm size) which is projected by a projector, on the wall-chart with a magnificated scale. The counting is made on 3 different pieces of the same film and a final number is given by the expression No=A/S where No is the number of gels per m², A is the number of gels counted on 3 film pieces and S is the overall surface in m² of the 3 films pieces examined.

EXAMPLES

PREPARATION OF THE SPHERICAL SUPPORT (ADDUCT MgCl₂/EtOH)

A magnesium chloride and alcohol adduct was prepared following the method described in example 2 of U.S. Pat. No. 4,399,054, but working at 2000 RPM instead of 10000 RPM. The adduct containing about 3 mols of alcohol had an average size of about 70 µm with a dispersion range of about 45–100 µm.

Example 1

Preparation of the Solid Component

The spherical support, prepared according to the general method underwent a thermal treatment, under $N_2$ stream, over a temperature range of 50–150° C. until spherical particles having a residual alcohol content of about 25% (0.69 mole of alcohol for each $MgCl_2$ mole) were obtained. Into a 72 l steel reactor provided with stirrer, 44 liters of $TiCl_4$ at 0° C. and whilst stirring 2200 g of the support were introduced. The whole was heated to 130° C. over 60 minutes and these conditions were maintained for a further 60 minutes. The stirring was interrupted and after 30 minutes the liquid phase was separated from the settled solid. Thereafter 4 washings with anhydrous hexane (about 22 liters) were performed two of which were carried out at 80° C. and two at room temperature.

Then, after the addiction of 31 liters of anhydrous hexane, 11 liters of a solution of tris(2,4,4-trimethyl-pentyl) aluminum (Tioa) in hexane (100 g/l) were introduced at room temperature into the reactor and stirred for 30 minutes. The liquid phase was separated from the settled solid that was washed with 22 liters of hexane and with 22 liters of heptane (twice for each other) at room temperature.

Thereafter a further treatment with 44 liters of $TiCl_4$ was performed in the same condition with respect to the first one, and after 4 washings with anhydrous hexane, 2200 g of the spherical solid component were obtained. After drying under vacuum at about 50° C., the solid showed the following characteristics:

| Total titanium | 4.6% (by weight) |
| $Ti^{III}$ | 0.6% (by weight) |
| M | 0.11% (by weight) |
| Mg | 17.0% (by weight) |
| Cl | 73.4% (by weight) |
| OEt | 0.3% (by weight) |
| porosity (B.E.T.) | 0.153 cm³/g |
| surface area (B.E.T.) | 50.6 m²/g |
| total porosity (Hg) | 0.692 cm³/g, 70% of which was due to pores with radius up to 0.1 µm. |
| Porosity due to pores with radius up to 1 µm: 0.552 | |
| Average pore radius: | 0.0827 |
| surface area (Hg) | 31.5 m²/g |

Ethylene Polymerization (HDPE)

Into a 10 liters stainless steel autoclave, degassed under $N_2$ stream at 70° C., 4 liters of anhydrous hexane, 0.15 g of spherical component and 1.5 g of triisobutylaluminum (Tiba) were introduced. The whole was stirred, heated to 75° C. and thereafter 4 bar of $H_2$ and 7 bar of ethylene were fed. The polymerization lasted 3 hours during which ethylene was fed to keep the pressure constant. 2120 g of polymer was obtained having the following characteristics:

| | |
|---|---|
| MIE | 0.12 g/10 min |
| MIF/MIE | 127.5 |
| effective density | 0.960 g/cm$^3$ |
| bulk density | 0.355 g/cm$^3$ |
| morphology | spherical |

1 kg of the so obtained polymer has been subject to the measurement of the gel number according to the procedure previously described and the result was 730 gel/m$^2$.

Example 2

Preparation of the Solid Component

The spherical support, prepared according to the general method underwent a thermal treatment, under N$_2$ stream, over a temperature range of 50–150° C. until spherical particles having a residual alcohol content of about 15% (0.37 mole of alcohol for each MgCl$_2$ mole) were obtained. Into a 2 l glass reactor provided with stirrer, 0.5 liters of TiCl$_4$ at 0° C. and whilst stirring 50 g of the support were introduced. The whole was heated to 60° C. over 15 minutes and these conditions were maintained for a further 60 minutes. The stirring was interrupted and after 10 minutes the liquid phase was separated from the settled solid. Thereafter 3 washings with anhydrous hexane (about 0.5 liters) were performed at room temperature. Then, after the addiction of 1 liter of anhydrous heptane, 0.24 liters of a solution of tris(2,4,4-trimethyl-pentyl)aluminum (Tioa) in hexane (250 g/l) were introduced at room temperature into the reactor. The reactor was heated at 50° C. and the solution was stirred for 60 minutes. The liquid phase was separated from the settled solid that was washed twice with 0.5 liters of hexane at room temperature.

Into the reactor, 0.5 liters of TiCl$_4$ and 0.5 liters of heptane were introduced, the solution was heated at 100° C. and after 30 minutes and the liquid phase was separated from the solid component.

Then, 1 liter of TiCl$_4$ was introduced into the glass reactor. The whole was heated to 130° C. over 30 minutes and these conditions were maintained for a further 60 minutes. The stirring was interrupted and after 10 minutes the liquid phase was separated from the settled solid. Thereafter 3 washings with anhydrous hexane at 60° C. and 3 washings at room temperature were performed. After drying under vacuum at about 50° C., the solid showed the following characteristics:

| | |
|---|---|
| Total titanium | 3.3% (by weight) |
| Ti$^{III}$ | 1.0% (by weight) |
| Al | 0.4% (by weight) |
| Mg | 20.2% (by weight) |
| Cl | 72.7% (by weight) |
| OEt | 1.2% (by weight) |
| porosity (B.E.T.) | 0.298 cm$^3$/g, |
| surface area (B.E.T.) | 2.2 m$^2$/g |
| total porosity (Hg) | 0.684 cm$^3$/g, 80% of which was due to pores with radius up to 0.1 $\mu$m. |
| Porosity due to pores with radius up to 1 $\mu$m: 0.631 | |
| Average pore radius: | 0.0558 |
| surface area (Hg) | 60.7 m$^2$/g |

Ethylene Polymerization (HDPE)

Into a 4 liters stainless steel autoclave, degassed under N$_2$ stream at 70° C., 1600 cc of anhydrous hexane, 0.02 g of spherical component and 0.3 g of triisobutylaluminum (Tiba) were introduced. The whole was stirred, heated to 75° C. and thereafter 4 bar of H$_2$ and 7 bar of ethylene were fed. The polymerization lasted 2 hours during which ethylene was fed to keep the pressure constant. 225 g of polymer was obtained having the following characteristics:

| | |
|---|---|
| MIE | 0.14 g/10 min |
| MIF/MIE | 137.0 |
| effective density | 0.960 g/cm$^3$ |
| bulk density | 0.40 g/cm$^3$ |
| morphology | spherical |

Example 3

Into a 1 l glass reactor provided with stirrer, 0.8 liters of TiCl$_4$ at 0° C. and whilst stirring 40 g of the support prepared as explained into the example 3, were introduced. The whole was heated to 130° C. over 15 minutes and these conditions were maintained for a further 30 minutes. The stirring was interrupted and after 10 minutes the liquid phase was separated from the settled solid. Thereafter 3 washings with anhydrous hexane (about 0.8 liters) were performed at room temperature.

Then, after the addiction of 0.3 liter of anhydrous hexane, 37 cc of a solution of triethylauminum (Tea) in hexane (100 g/l) were introduced at room temperature into the reactor and stirred for 30 minutes. The liquid phase was separated from the settled solid that was washed three times with 0.4 liters of heptane at room temperature.

Into the reactor, 0.8 liters of TiCl$_4$ were introduced, the solution was heated at 130° C. and after 30 minutes and the liquid phase was separated from the solid component. Thereafter 3 washings with anhydrous hexane at 60° C. and 3 washings at room temperature were performed. After drying under vacuum at about 50° C., the solid showed the following characteristics:

| | |
|---|---|
| Total titanium | 5.9% (by weight) |
| Ti$^{III}$ | 2.7% (by weight) |
| Al | 0.52% (by weight) |
| Mg | 18.8% (by weight) |
| Cl | 71.2% (by weight) |
| OEt | 0.6% (by weight) |
| porosity (B.E.T.) | 0.239 cm$^3$/g, |
| surface area (B.E.T.) | 43.1 m$^2$/g |
| total porosity (Hg) | 0.402 cm$^3$/g, 85% of which was due to pores with radius up to 0.1 $\mu$m. |
| Porosity due to pores with radius up to 1 $\mu$m: 0.359 | |
| Average pore radius: | 0.0369 $\mu$m |
| surface area (Hg) | 54.0 m$^2$g |

Ethylene Polymerization (HDPE)

0.02 g of the spherical component were used in ethylene polymerization under the same conditions described in example 2.

180 g of polymer were obtained having the following characteristics:

| | |
|---|---|
| MIE | 0.16 g/10 min |
| MIF/MIE | 152.0 |
| effective density | 0.960 g/cm³ |
| bulk density | 0.414 g/cm³ |
| morphology | spherical |

Comparison Example 4

Preparation of the Solid Component

The spherical support, prepared according to the general method underwent a thermal treatment, under $N_2$ stream, over a temperature range of 50–150° C. until spherical particles having a residual alcohol content of about 35% (1.1 mole of alcohol for each $MgCl_2$ mole) were obtained. 2700 g of this support were introduced into a 60-lautoclave together with 38 l of anhydrous hexane. Under stirring and at room temperature 11.6 liters of hexane solution containing 100 g/l of $AlEt_3$ were fed over 60 minutes.

The temperature was raised to 50° C. over 60 minutes and was maintained at that temperature for a further 30 minutes whilst stirring. The liquid phase was removed by filtration; the treatment with $AlEt_3$ was repeated twice again under the same conditions. The spherical product obtained was washed three times with anhydrous hexane and dried at 50° C. under vacuum. The thus obtained support showed the following characteristics:

| | |
|---|---|
| porosity (Hg) | 1.2 g/cm³ |
| surface area (Hg) | 18. m²/g |
| OEt residual | 5.% (by weight) |
| Al residual | 3.4% (by weight) |
| Mg | 20.1% (by weight) |

Into a 72 l steel reactor provided with stirrer 40 liters of $TiCl_4$ were introduced; at room temperature and whilst stirring 1900 g of the above described support were introduced. The whole was heated to 100° C. over 60 minutes and these conditions were maintained for a further 60 minutes. The stirring was interrupted and after 30 minutes the liquid phase was separated from the settled solid. Two further treatments were carried out under the same conditions with the only difference that in the first of these treatment it was carried out at 120° C. and in the second at 135° C. Thereafter 7 washings with anhydrous hexane (about 19 liters) were carried out three of which were carried out at 60° C. and 4 at room temperature. 2400 g of component in spherical form were obtained which, after drying under vacuum at about 50° C., showed the following characteristics:

| | |
|---|---|
| Total titanium | 8.2% (by weight) |
| $Ti^{III}$ | 6.1% (by weight) |
| Al | 1.4% (by weight) |
| Mg | 16% (by weight) |
| Cl | 67.8% (by weight) |
| OEt | 0.3% (by weight) |
| porosity (B.E.T.) | 0.155 cm³/g, |
| surface area (B.E.T.) | 32.9 m²/g |
| total porosity (Hg) | 0.534 cm³/g, |
| | 40% of which was due to pores with radius up to 0.1 μm. |
| Porosity due to pores with radius up to 1 μm: 0.475 | |
| Average pore radius: | 0.2294 μm |
| surface area (Hg) | 40 m²/g |

Ethylene Polymerization (HDPE)

Into a 10 liters stainless steel autoclave, degassed under $N_2$ stream at 70° C., 4 liters of anhydrous hexane, 0.02 g of spherical component and 1.2 g of triisobutylaluminum (Tiba) were introduced. The whole was stirred, heated to 75° C. and thereafter 4 bar of $H_2$ and 7 bar of ethylene were fed. The polymerization lasted 3 hours during which ethylene was fed to keep the.pressure constant. 1920 g of polymer was obtained having the following characteristics:

| | |
|---|---|
| MIE | 0.11 g/10 min |
| MIF/MIE | 105 |
| effective density | 0.960 g/cm³ |
| bulk density | 0.315 g/cm³ |

1 kg of the so obtained polymer has been subject to the measurement of the gel number according to the procedure previously described and the result was 9000 gel/M².

Example 5

Preparation of HDPE by a two Step Sequential Polymerization Process

Into a 4 liters stainless steel autoclave, degassed under $N_2$ stream at 70° C., 2 liters of propane, 0.067 g of the spherical component prepared according to the procedure of Example 1 and 0.7 g of triisobutylaluminum (Tiba) were introduced. The whole was stirred, heated to 75° C. and thereafter 2.5 bar of $H_2$ and 7 bar of ethylene were fed. The polymerization lasted 30 minutes during which 160 g of polyethylene were produced. After this period the autoclave was degassed and then a second step was performed with the same catalyst and under the same conditions with the only difference that the hydrogen pressure was 7 bar. This second step lasted 7 hours and gave 640 g of polyethylene.

The total 800 g therefore obtained had the following characteristics:

| | |
|---|---|
| MIE | 0.21 g/10 min |
| MIF/MIE | 212 |
| effective density | 0.960 g/cm³ |
| bulk density | 0.41 g/cm³ |
| Gel number | 500/m² |

What is claimed is:

1. Catalyst components for the polymerization of olefins $CH_2$=$CHR^{VIII}$, wherein $R^{VIII}$ is hydrogen or an hydrocarbon radical having 1–12 carbon atoms, comprising Ti, Mg and Cl, and characterized by the following properties:
   surface area, determined by BET method, of lower than 100 m²/g,
   a total porosity, measured by the mercury method, of higher than 0.25 cm³/g and,
   a pore radius distribution such that at least 45% of the total porosity, as measured by the mercury method, is due to pores with radius up to 0.1 μm.

2. Catalyst components according to claim 1 in which the catalyst component comprises a Ti compound having at least one Ti-halogen bond supported on magnesium chloride in active form.

3. Catalyst components according to claim 1 containing groups different from halogen, in an amount lower than 0.3 mole for each mole of titanium.

4. Catalyst components according to claim 1 in which the total porosity is between 0.35 and 1.2 cm$^3$/g.

5. Catalyst components according to claim 4 in which the total porosity is between 0.38 and 0.9 cm$^3$/g.

6. Catalyst components according to claim 1 in which the porosity due to pores with radius up to 1 $\mu$m is between 0.3 and 1 cm$^3$/g.

7. Catalyst components according to claim 6 in which the porosity due to pores with radius up to 1 $\mu$m is between 0.34 and 0.8.

8. Catalyst components according to claim 4 in which the value of the porosity due to pores with radius higher than 1 $\mu$m is lower than 25% with respect to the total porosity.

9. Catalyst components according to claim 8 in which the value of the porosity due to pores with radius higher than 1 $\mu$m is lower than 15% with respect to the total porosity.

10. Catalyst components according to claim 1 in which the surface area measured by the B.E.T. method is lower than 80 m$^2$/g.

11. Catalyst components according to claim 10 in which the surface area is between 30 and 70 m$^2$/g.

12. Catalyst components according to claim 1 in which the porosity measured by the BET method is comprised between 0.1 and 0.5 cm$^3$/g.

13. Catalyst components according to claim 12 in which the porosity is from 0.15 to 0.4 cm$^3$/g.

14. Catalyst components according to claim 1 in which more than 50% of the total porosity is due to pores with radius up to 0.1 $\mu$m.

15. Catalyst components according to claim 1 in which more than 65% of the total porosity is due to pores with radius up to 0.1 $\mu$m.

16. Catalyst components according to claim 1 in which an average pore radius value, for porosity due to pores up to 1 $\mu$m, is lower than 0.09 $\mu$m.

17. Catalyst components according to claim 16 in which the average pore radius value, for porosity due to pores up to 1 $\mu$m, is lower than 0.08 $\mu$m.

18. Catalyst components according to claim 17 in which the average pore radius value, for porosity due to pores up to 1 $\mu$m, is lower than 0.07 $\mu$m.

19. Catalyst components according to claim 1 in which the titanium compound has the formula Ti(OR$^V$)$_n$X$_{y-n}$, wherein n is a number comprised between 0 and 0.5 inclusive, y is the valence of titanium, R$^V$ is an alkyl, cycloalkyl or aryl radical having 2–8 carbon atoms and X is chlorine.

20. Catalyst components according to claim 19 in which y is 3 or 4, and n is 0.

21. A process for the preparation of the catalyst components of claim 1 comprising the following steps:
(a) reacting a compound MgCl$_2$.mR$^{VI}$OH, wherein 0.3≦m≦1.7 and R$^{VI}$ is an alkyl, cycloalkyl or aryl radical having 1–12 carbon atoms, with a titanium compound of the formula Ti(OR$^V$)$_n$X$_{y-n}$, in which n is comprised between 0 and 0.5, y is the valence of titanium, X is halogen and R$^V$ is an alkyl radical having 2–8 carbon atoms;
(b) reacting the product obtained from (a) with an Al-alkyl compound and
(c) reacting the product obtained from (b) with a titanium compound of the formula Ti(OR$^V$)$_n$X$_{y-n}$, in which n is comprised between 0 and 0.5, y is the valence of titanium, X is halogen and R$^V$ is an alkyl radical having 2–8 carbon atoms.

22. The process according to claim 21 in which the compound MgCl$_2$.mR$^{VI}$OH is prepared by thermal dealcoholation of adducts MgCl$_2$.pR$^{VI}$OH, wherein p is a number higher than 2.

23. The process according to claim 21 in which the titanium compound used in steps (a) and (c) is TiCl$_4$.

24. The process according to claim 21 in which R$^{VI}$ is ethyl.

25. The process according to claim 21 in which the aluminum alkyl compound of step (b) is selected from those of formula R$_z$AlX$_{3-z}$ in which R is a C$_1$–C$_{20}$ hydrocarbon group, z is an integer ranging from 1 to 3 and X is chlorine.

26. The process according to claim 25 in which the aluminum alkyl compound is a trialkyl aluminum compound selected from the group consisting of triethylaluminum, triisobutylaluminum, tri-n-butylaluminum, tri-n-hexylaluminum and tri-n-octylaluminum.

27. The process according to claim 26 in which the aluminum alkyl compound is tri-n-octylaluminum.

28. Catalysts for the polymerization of olefins comprising the product of the reaction between an aluminum alkyl compound and a catalyst component according to claim 1.

29. Process for the polymerization of olefins CH$_2$=CHR$^{VIII}$, wherein R$^{III}$ is hydrogen or an hydrocarbon radical having 1–12 carbon atoms, carried out in the presence of a catalyst according to claim 28.

30. Process for the preparation of broad molecular weight distribution ethylene polymers having a F/E ratio higher than 100 characterized in that it is carried out in the presence of a catalyst according to claim 28.

31. The process according to claim 30 in which the F/E ratio is higher than 120.

32. The process according to claim 30 characterized by the fact that it is carried out in more than one step working under different polymerization conditions.

33. Pre-polymerized catalyst for the polymerization of olefins obtained by pre-polymerizing ethylene or mixtures thereof containing one or more α-olefins, with a catalyst according to claim 28 and thereby forming amounts of polymer from 0.1 up to 1000 g per gram of solid catalyst component.

34. The process for the polymerization of olefins CH$_2$=CHR$^{VIII}$, wherein R$^{VIII}$ is hydrogen or an hydrocarbon radical having 1–12 carbon atoms, carried out in the presence of a catalyst according to claim 33.

35. The process for the preparation of broad molecular weight distribution ethylene polymers having a F/E ratio higher than 100 characterized in that it is carried out in the presence of a catalyst according to claim 33.

* * * * *

UNITED STATES PATENT AND TRADEMARK OFFICE
CERTIFICATE OF CORRECTION

PATENT NO. : 6,627,710 B1
DATED : September 30, 2003
INVENTOR(S) : Mario Sacchetti et al.

It is certified that error appears in the above-identified patent and that said Letters Patent is hereby corrected as shown below:

Column 14,
Line 32, change "$R^{III}$" to -- $R^{VIII}$ --.

Signed and Sealed this

Second Day of August, 2005

JON W. DUDAS
*Director of the United States Patent and Trademark Office*